(12) United States Patent
Cana et al.

(10) Patent No.: US 10,974,756 B2
(45) Date of Patent: Apr. 13, 2021

(54) CLUTCH DEVICE LATCHING SYSTEM AND METHOD

(71) Applicant: STEERING SOLUTIONS IP HOLDING CORPORATION, Saginaw, MI (US)

(72) Inventors: Edward A. Cana, Grand Blanc, MI (US); Keyur R. Patel, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 177 days.

(21) Appl. No.: 16/050,832

(22) Filed: Jul. 31, 2018

(65) Prior Publication Data

US 2020/0039563 A1 Feb. 6, 2020

(51) Int. Cl.
  *B62D 1/184* (2006.01)
  *B62D 1/185* (2006.01)
  *B62D 1/183* (2006.01)

(52) U.S. Cl.
  CPC ............. *B62D 1/184* (2013.01); *B62D 1/183* (2013.01); *B62D 1/185* (2013.01)

(58) Field of Classification Search
  CPC ........ B62D 1/184; B62D 1/183; B62D 1/185; B62D 1/181
  See application file for complete search history.

(56) References Cited

U.S. PATENT DOCUMENTS

| | | | |
|---|---|---|---|
| 1,795,567 A | 3/1931 | Maurice | |
| 3,369,425 A | 2/1968 | Runkle et al. | |
| 3,386,309 A | 6/1968 | Reed et al. | |
| 3,396,600 A | 8/1968 | Zeigler et al. | |
| 3,782,492 A | 1/1974 | Hollins | |
| 4,138,167 A | 2/1979 | Ernst et al. | |
| 4,315,117 A | 2/1982 | Kokubo et al. | |
| 4,337,967 A | 7/1982 | Yoshida et al. | |
| 4,476,954 A | 10/1984 | Johnson et al. | |
| 4,503,300 A | 3/1985 | Lane, Jr. | |
| 4,503,504 A | 3/1985 | Suzumura et al. | |
| 4,509,386 A | 4/1985 | Kimberlin | |
| 4,535,645 A | 8/1985 | De Bisschop et al. | |
| 4,559,816 A | 12/1985 | Ebert et al. | |
| 4,561,323 A | 12/1985 | Stromberg | |
| 4,570,776 A | 2/1986 | Iwashita et al. | |
| 4,598,604 A | 7/1986 | Sorsche et al. | |
| 4,602,520 A | 7/1986 | Nishikawa et al. | |
| 4,633,732 A | 1/1987 | Nishikawa et al. | |

(Continued)

FOREIGN PATENT DOCUMENTS

| | | |
|---|---|---|
| CN | 1550395 A | 12/2004 |
| CN | 1722030 A | 1/2006 |

(Continued)

*Primary Examiner* — James A English
*Assistant Examiner* — Kurtis Nielson
(74) *Attorney, Agent, or Firm* — Dickinson Wright PLLC

(57) ABSTRACT

A retractable steering column assembly includes a retractable portion. Also included is an electric actuator mechanism for translating and/or tilting the retractable portion. Further included is a latch moveable between a latched condition and an unlatched condition, the unlatched condition allowing manual adjustment of the retractable portion, the latched condition preventing manual adjustment of the retractable portion.

12 Claims, 5 Drawing Sheets

(56) References Cited

U.S. PATENT DOCUMENTS

| | | |
|---|---|---|
| 4,661,752 A | 4/1987 | Nishikawa et al. |
| 4,669,325 A | 6/1987 | Nishikawa et al. |
| 4,691,587 A | 9/1987 | Farrand et al. |
| 4,785,684 A | 11/1988 | Nishikawa et al. |
| 4,811,580 A | 3/1989 | Jang |
| 4,836,566 A | 6/1989 | Birsching |
| 4,881,020 A | 11/1989 | Hida et al. |
| 4,893,518 A | 1/1990 | Matsumoto et al. |
| 4,901,544 A | 2/1990 | Jang |
| 4,901,593 A | 2/1990 | Ishikawa |
| 4,921,066 A | 5/1990 | Conley |
| 4,941,679 A | 7/1990 | Baumann et al. |
| 4,943,028 A | 7/1990 | Hoffmann et al. |
| 4,962,570 A | 10/1990 | Hosaka et al. |
| 4,967,618 A | 11/1990 | Matsumoto et al. |
| 4,976,239 A | 12/1990 | Hosaka |
| 5,048,364 A | 9/1991 | Minamoto et al. |
| 5,226,853 A | 7/1993 | Courgeon |
| 5,240,284 A | 8/1993 | Takada et al. |
| 5,295,712 A | 3/1994 | Omura |
| 5,311,432 A | 5/1994 | Momose |
| 5,319,803 A | 6/1994 | Allen |
| 5,428,873 A | 7/1995 | Hitchcock et al. |
| 5,488,555 A | 1/1996 | Asgari et al. |
| 5,590,565 A | 1/1997 | Palfenier et al. |
| 5,606,892 A | 3/1997 | Hedderly |
| 5,613,404 A | 3/1997 | Lykken et al. |
| 5,618,058 A | 4/1997 | Byon |
| 5,668,721 A | 9/1997 | Chandy |
| 5,678,454 A | 10/1997 | Cartwright et al. |
| 5,690,362 A | 11/1997 | Peitsmeier et al. |
| 5,737,971 A | 4/1998 | Riefe et al. |
| 5,765,116 A | 6/1998 | Wilson-Jones et al. |
| 5,813,699 A | 9/1998 | Donner et al. |
| 5,890,397 A | 4/1999 | Stoner et al. |
| 5,893,580 A | 4/1999 | Hoagland et al. |
| 5,911,789 A | 6/1999 | Keipert et al. |
| 5,931,250 A | 8/1999 | Kagawa et al. |
| 5,941,130 A | 8/1999 | Olgren et al. |
| 6,041,677 A | 3/2000 | Reh et al. |
| 6,070,686 A | 6/2000 | Pollmann |
| 6,079,513 A | 6/2000 | Nishizaki et al. |
| 6,142,523 A | 11/2000 | Bathis et al. |
| 6,220,630 B1 | 4/2001 | Sundholm et al. |
| 6,227,571 B1 | 5/2001 | Sheng et al. |
| 6,234,040 B1 | 5/2001 | Weber et al. |
| 6,264,239 B1 | 7/2001 | Link |
| 6,301,534 B1 | 10/2001 | McDermott, Jr. et al. |
| 6,343,993 B1 | 2/2002 | Duval et al. |
| 6,354,622 B1 | 3/2002 | Ulbrich et al. |
| 6,354,626 B1 | 3/2002 | Cartwright |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,460,427 B1 | 10/2002 | Hedderly |
| 6,571,587 B2 | 6/2003 | Dimig et al. |
| 6,578,449 B1 | 6/2003 | Anspaugh et al. |
| 6,611,745 B1 | 8/2003 | Paul |
| 6,612,198 B2 | 9/2003 | Rouleau et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,025,380 B2 | 4/2006 | Arihara |
| 7,048,305 B2 | 5/2006 | Muller |
| 7,062,365 B1 | 6/2006 | Fei |
| 7,140,213 B2 | 11/2006 | Feucht et al. |
| 7,159,904 B2 | 1/2007 | Schafer et al. |
| 7,213,842 B2 | 5/2007 | Uehle et al. |
| 7,258,365 B2 | 8/2007 | Kahlenberg et al. |
| 7,261,014 B2 | 8/2007 | Arihara |
| 7,290,800 B2 | 11/2007 | Schwarzbich et al. |
| 7,295,904 B2 | 11/2007 | Kanevsky et al. |
| 7,308,964 B2 | 12/2007 | Hara et al. |
| 7,410,190 B2 * | 8/2008 | Sawada ............... B62D 1/19 180/427 |
| 7,428,944 B2 | 9/2008 | Gerum |
| 7,461,863 B2 | 12/2008 | Muller |
| 7,495,584 B1 | 2/2009 | Sorensen |
| 7,533,594 B2 | 5/2009 | Menjak et al. |
| 7,628,244 B2 | 12/2009 | Chino et al. |
| 7,719,431 B2 | 5/2010 | Bolourchi |
| 7,735,405 B2 | 6/2010 | Parks |
| 7,758,073 B1 | 7/2010 | Chou |
| 7,775,129 B2 | 8/2010 | Oike et al. |
| 7,784,830 B2 | 8/2010 | Ulintz |
| 7,793,980 B2 | 9/2010 | Fong |
| 7,862,079 B2 | 1/2011 | Fukawatase et al. |
| 7,975,569 B2 | 1/2011 | Klos |
| 7,894,951 B2 | 2/2011 | Norris et al. |
| 7,909,361 B2 | 3/2011 | Oblizajek et al. |
| 7,913,803 B2 | 3/2011 | Hidaka |
| 8,002,075 B2 | 8/2011 | Markfort |
| 3,021,235 A1 | 9/2011 | Tinnin et al. |
| 8,011,265 B2 | 9/2011 | Menjak et al. |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,161,839 B2 | 4/2012 | Warashina |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,466,382 B2 | 6/2013 | Donicke |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,733,201 B2 | 5/2014 | Okano et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,955,407 B2 | 2/2015 | Sakuma |
| 8,979,126 B2 * | 3/2015 | Morinaga ............... B62D 1/181 280/775 |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,039,041 B2 | 5/2015 | Buzzard et al. |
| 9,045,078 B2 | 6/2015 | Tovar et al. |
| 9,073,574 B2 | 7/2015 | Cuddihy et al. |
| 9,080,895 B2 | 7/2015 | Martin et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |

(56) References Cited

U.S. PATENT DOCUMENTS

| | | |
|---|---|---|
| 9,290,201 B1 | 3/2016 | Lombrozo |
| 9,296,410 B2 | 3/2016 | Isogai et al. |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,108 B2 | 6/2016 | Pfenninger et al. |
| 9,360,865 B2 | 6/2016 | Yopp |
| 9,421,994 B2 | 8/2016 | Agbor et al. |
| 9,487,228 B2 | 11/2016 | Febre et al. |
| 9,550,514 B2 | 1/2017 | Schulz et al. |
| 9,616,914 B2 | 4/2017 | Stinebring et al. |
| 9,643,641 B1 | 5/2017 | Stinebring et al. |
| 9,663,136 B2 | 5/2017 | Stinebring et al. |
| 9,744,983 B2 | 8/2017 | Stinebring et al. |
| 9,828,016 B2 | 11/2017 | Lubischer |
| 9,845,106 B2 | 12/2017 | Bodtker |
| 9,849,904 B2 | 12/2017 | Rouleau |
| 9,862,403 B1 | 1/2018 | Rouleau et al. |
| 9,919,724 B2 | 3/2018 | Lubischer et al. |
| 10,065,655 B2 | 9/2018 | Bendewald et al. |
| 10,189,496 B2* | 1/2019 | King ................ B62D 1/184 |
| 2002/0171235 A1 | 11/2002 | Riefe et al. |
| 2003/0046012 A1 | 3/2003 | Yamaguchi |
| 2003/0146037 A1 | 8/2003 | Menjak et al. |
| 2003/0183440 A1 | 10/2003 | Thomas et al. |
| 2003/0188598 A1 | 10/2003 | Cartwright |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0046379 A1 | 3/2004 | Riefe |
| 2004/0099083 A1 | 5/2004 | Choi et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0242562 A1 | 11/2005 | Ridgway et al. |
| 2005/0263996 A1 | 12/2005 | Manwaring et al. |
| 2005/0275205 A1 | 12/2005 | Ahnafield |
| 2006/0005658 A1 | 1/2006 | Armstrong et al. |
| 2006/0186658 A1 | 8/2006 | Yasuhara et al. |
| 2006/0202463 A1 | 9/2006 | Schwarzbich et al. |
| 2006/0219499 A1 | 10/2006 | Organek |
| 2006/0224287 A1 | 10/2006 | Izawa et al. |
| 2006/0230863 A1* | 10/2006 | Rouleau ................ B62D 1/184 74/492 |
| 2006/0237959 A1 | 10/2006 | Dimig et al. |
| 2006/0244251 A1 | 11/2006 | Muller |
| 2006/0283281 A1 | 12/2006 | Li et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito et al. |
| 2007/0096446 A1 | 5/2007 | Breed |
| 2007/0126222 A1 | 6/2007 | Koya et al. |
| 2007/0158116 A1 | 7/2007 | Peppler |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0028884 A1 | 2/2008 | Monash |
| 2008/0047382 A1 | 2/2008 | Tomaru et al. |
| 2008/0079253 A1 | 4/2008 | Sekii et al. |
| 2008/0147276 A1 | 6/2008 | Pattok et al. |
| 2008/0216597 A1 | 9/2008 | Iwakawa et al. |
| 2008/0238068 A1* | 10/2008 | Kumar ................ B62D 1/183 280/775 |
| 2008/0264196 A1 | 10/2008 | Schindler et al. |
| 2009/0024278 A1 | 1/2009 | Kondo et al. |
| 2009/0056493 A1 | 3/2009 | Dubay et al. |
| 2009/0107284 A1 | 4/2009 | Lucas et al. |
| 2009/0229400 A1 | 9/2009 | Ozsoylu et al. |
| 2009/0256342 A1 | 10/2009 | Cymbal et al. |
| 2009/0266195 A1* | 10/2009 | Tanke ................ B62D 1/184 74/493 |
| 2009/0276111 A1 | 11/2009 | Wang et al. |
| 2009/0280914 A1 | 11/2009 | Kakutani et al. |
| 2009/0292466 A1 | 11/2009 | McCarthy et al. |
| 2010/0152952 A1 | 6/2010 | Lee et al. |
| 2010/0218637 A1 | 9/2010 | Barroso |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0167948 A1* | 7/2011 | Andrearczyk ......... B62D 1/181 74/493 |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2011/0314954 A1 | 12/2011 | Matsuno et al. |
| 2012/0136540 A1 | 5/2012 | Miller |
| 2012/0174695 A1* | 7/2012 | Bertet ................ B62D 1/184 74/493 |
| 2012/0205183 A1 | 8/2012 | Rombold |
| 2012/0209473 A1 | 8/2012 | Birsching et al. |
| 2012/0215377 A1 | 8/2012 | Takemura et al. |
| 2012/0247259 A1* | 10/2012 | Mizuno ................ B62D 1/181 74/493 |
| 2012/0287050 A1 | 11/2012 | Wu |
| 2013/0002416 A1 | 1/2013 | Gazit |
| 2013/0325202 A1 | 1/2013 | Howard et al. |
| 2013/0087006 A1 | 4/2013 | Ohtsubo et al. |
| 2013/0104689 A1 | 5/2013 | Marutani et al. |
| 2013/0133463 A1 | 5/2013 | Moriyama |
| 2013/0158771 A1 | 6/2013 | Kaufmann |
| 2013/0174686 A1 | 7/2013 | Hirche et al. |
| 2013/0199866 A1 | 8/2013 | Yamamoto et al. |
| 2013/0205933 A1 | 8/2013 | Moriyama |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2013/0325264 A1 | 12/2013 | Alcazar et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0116187 A1 | 5/2014 | Tinnin |
| 2014/0137694 A1 | 5/2014 | Sugiura |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer et al. |
| 2015/0051780 A1 | 1/2015 | Hahne |
| 2015/0120142 A1 | 1/2015 | Park et al. |
| 2015/0210273 A1 | 2/2015 | Kaufmann et al. |
| 2015/0060185 A1 | 3/2015 | Feguri |
| 2015/0246673 A1 | 4/2015 | Tseng et al. |
| 2015/0137492 A1 | 5/2015 | Rao et al. |
| 2015/0203145 A1 | 7/2015 | Sugiura et al. |
| 2015/0203149 A1 | 7/2015 | Katayama et al. |
| 2015/0251666 A1 | 7/2015 | Attard et al. |
| 2015/0324111 A1 | 9/2015 | Jubner et al. |
| 2015/0283998 A1 | 10/2015 | Lind et al. |
| 2015/0375769 A1 | 12/2015 | Abboud et al. |
| 2016/0009332 A1 | 1/2016 | Sirbu |
| 2016/0016604 A1 | 1/2016 | Johta et al. |
| 2016/0075371 A1 | 3/2016 | Varunjikar et al. |
| 2016/0082867 A1 | 3/2016 | Sugioka et al. |
| 2016/0200246 A1 | 3/2016 | Lisseman et al. |
| 2016/0114828 A1 | 4/2016 | Tanaka et al. |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207538 A1 | 7/2016 | Urano et al. |

(56) References Cited

U.S. PATENT DOCUMENTS

| | | |
|---|---|---|
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0244070 A1* | 8/2016 | Bendewald .............. B62D 1/28 |
| 2016/0244086 A1 | 8/2016 | Moriyama |
| 2016/0252133 A1 | 9/2016 | Caverly |
| 2016/0318540 A1 | 11/2016 | King |
| 2016/0318542 A1 | 11/2016 | Pattok et al. |
| 2016/0347347 A1 | 12/2016 | Lubischer et al. |
| 2016/0347348 A1 | 12/2016 | Lubischer et al. |
| 2016/0362084 A1 | 12/2016 | Martin et al. |
| 2016/0362117 A1 | 12/2016 | Kaufmann et al. |
| 2016/0362126 A1* | 12/2016 | Lubischer .............. B62D 1/183 |
| 2016/0368522 A1 | 12/2016 | Lubischer |
| 2016/0375770 A1 | 12/2016 | Ryne et al. |
| 2016/0375860 A1 | 12/2016 | Lubischer |
| 2016/0375923 A1 | 12/2016 | Schulz |
| 2016/0375924 A1 | 12/2016 | Bodtker et al. |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer et al. |
| 2017/0029009 A1 | 2/2017 | Rouleau |
| 2017/0029018 A1 | 2/2017 | Lubischer et al. |
| 2017/0057535 A1* | 3/2017 | Vermeersch ........... B62D 1/184 |
| 2017/0097071 A1 | 4/2017 | Galehr |
| 2017/0106894 A1 | 4/2017 | Bodtker |
| 2017/0106895 A1 | 4/2017 | Jager et al. |
| 2017/0113589 A1 | 4/2017 | Riefe |
| 2017/0113712 A1 | 4/2017 | Watz |
| 2017/0151975 A1 | 7/2017 | Schmidt et al. |
| 2017/0294120 A1 | 10/2017 | Ootsuji |
| 2017/0297606 A1 | 10/2017 | Kim et al. |
| 2017/0341677 A1 | 11/2017 | Buzzard et al. |
| 2017/0361863 A1 | 12/2017 | Rouleau |
| 2017/0369091 A1* | 12/2017 | Nash ..................... B62D 1/183 |
| 2018/0029628 A1 | 2/2018 | Sugishita |
| 2018/0029640 A1 | 2/2018 | Otto et al. |
| 2018/0050720 A1 | 2/2018 | King et al. |
| 2018/0072339 A1 | 3/2018 | Bodtker |
| 2018/0079441 A1 | 3/2018 | McKinzie et al. |
| 2018/0086378 A1 | 3/2018 | Bell et al. |
| 2018/0111639 A1 | 4/2018 | Bodtker et al. |
| 2018/0148084 A1 | 5/2018 | Nash et al. |
| 2018/0154932 A1 | 6/2018 | Rakouth et al. |
| 2018/0229753 A1 | 8/2018 | Magnus et al. |
| 2018/0238400 A1 | 8/2018 | Magnus et al. |
| 2018/0251147 A1 | 9/2018 | Heitz et al. |
| 2018/0273081 A1 | 9/2018 | Lubischer et al. |

FOREIGN PATENT DOCUMENTS

| | | |
|---|---|---|
| CN | 1736786 A | 2/2006 |
| CN | 101037117 A | 9/2007 |
| CN | 101041355 A | 9/2007 |
| CN | 101049814 A | 10/2007 |
| CN | 101291840 A | 10/2008 |
| CN | 101402320 A | 4/2009 |
| CN | 101596903 A | 12/2009 |
| CN | 201534560 U | 7/2010 |
| CN | 101954862 A | 1/2011 |
| CN | 102161346 A | 8/2011 |
| CN | 102452391 A | 5/2012 |
| CN | 102523738 A | 6/2012 |
| CN | 102574545 B | 7/2012 |
| CN | 202337282 U | 7/2012 |
| CN | 102806937 A | 12/2012 |
| CN | 103085854 A | 5/2013 |
| CN | 103419840 A | 12/2013 |
| CN | 103587571 A | 2/2014 |
| CN | 203793405 U | 8/2014 |
| CN | 204222957 U | 3/2015 |
| DE | 4310431 A1 | 10/1994 |
| DE | 19954505 A1 | 5/2001 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102013110865 A1 | 4/2015 |
| DE | 102015216326 B4 | 9/2016 |
| EP | 1559630 A2 | 8/2005 |
| EP | 1783719 A2 | 5/2007 |
| EP | 2426030 A1 | 3/2012 |
| EP | 2489577 A2 | 8/2012 |
| EP | 1606149 B1 | 5/2014 |
| FR | 2862595 A1 | 5/2005 |
| FR | 3016327 A1 | 7/2015 |
| JP | S58191668A A | 11/1983 |
| JP | 60164629 A | 8/1985 |
| JP | S60157963 A | 8/1985 |
| JP | H05162652 A | 6/1993 |
| JP | 2007253809 A | 10/2007 |
| JP | 2012201334 A | 10/2012 |
| KR | 101062339 B1 | 9/2011 |
| WO | 2006099483 A1 | 9/2006 |
| WO | 2010082394 A1 | 7/2010 |
| WO | 2010116518 A1 | 10/2010 |
| WO | 2014208573 A1 | 12/2014 |

* cited by examiner

CLUTCH DEVICE LATCHING SYSTEM AND METHOD

BACKGROUND OF THE INVENTION

The embodiments described herein relate to retracting steering column assemblies and, more particularly, to a system and method associated with a clutch device latching system.

As autonomously driven vehicles are developed, a number of opportunities will evolve related to comfort, entertainment and functionality for drivers. Steering wheels are commonly limited to standard driving positions due to the need for a driver to handle the steering wheel during operation of the vehicle. These limitations may be unnecessary during an autonomous driving mode of a vehicle. For example, a steering wheel may be retracted to a stowed position to enlarge the space available for a driver.

An automated, electromechanical system is often relied upon to translate the steering column between an extended position and a retracted position. Some systems also allow manual adjustment of the steering column, but a clutch device and nut in a power column currently require a driver to wait until the column extends away from a retracted (also referred to as stowed) position before manual adjustment is available.

SUMMARY OF THE INVENTION

According to an aspect of the disclosure, a retractable steering column assembly includes a retractable portion. Also included is an electric actuator mechanism for translating and/or tilting the retractable portion. Further included is a latch moveable between a latched condition and an unlatched condition, the unlatched condition allowing manual adjustment of the retractable portion, the latched condition preventing manual adjustment of the retractable portion.

According to another aspect of the disclosure, a method of controlling adjustment of a steering column assembly is provided. The method includes detecting a position of the steering column assembly. The method also includes determining which one of a plurality of regions the telescope position is within. The method further includes unlatching a latch selectively engageable with the steering column assembly to allow manual adjustment of the steering column assembly if the steering column assembly is within at least one of the plurality of regions. The method yet further includes latching the latch to prevent manual adjustment of the steering column assembly if the retractable portion is within at least one of the plurality of regions.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
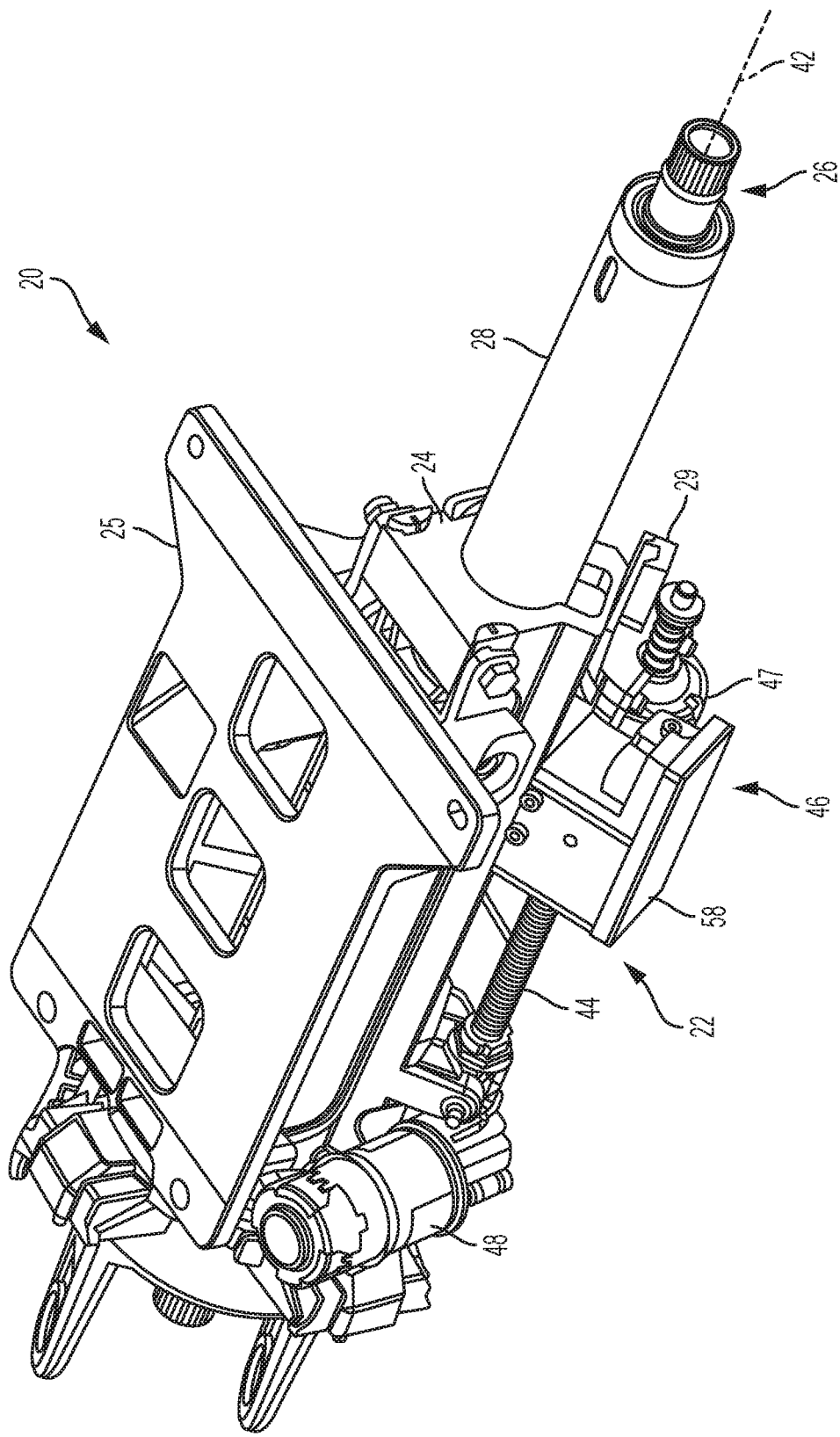
FIG. 1 is a perspective view of a steering column assembly.

Referring now to the Figures, where the invention will be described with reference to specific embodiments, without limiting same, FIG. 1 illustrates a steering column assembly 20. The steering column assembly 20 facilitates translation of a steering wheel (not shown) and a steering shaft 26 in a retractable manner. This is particularly beneficial in embodiments where the assembly 20 is employed in a passenger vehicle equipped with Advanced Driver Assist System(s) (ADAS) to allow the vehicle to be autonomously, or semi-autonomously, controlled using sensing, steering, and/or braking technology. When the ADAS is activated, the steering wheel is not required for vehicle control in some situations. Retraction of the steering wheel and steering shaft 26 toward, and possibly into, the instrument cluster greatly enhances user comfort by providing a driver with more space. The additional space provided facilitates additional workspace area or leg room, for example.

The embodiments described herein provide a retractable steering column which allows the steering wheel to be retracted while the vehicle is in an autonomous, or semi-autonomous, driving mode, and methods associated with monitoring and adjusting the steering column assembly 20. The operating conditions described herein for the steering wheel are standard driving mode, autonomous driving mode, and a transition mode therebetween.

In the standard driving mode, the steering column assembly 20 is extended to a location that disposes the steering wheel in a position that is comfortably reached by a driver in a manner that allows the driver to fully handle and control the steering wheel. The transition mode is defined by movement of the steering column assembly 20 during transitioning of the assembly between the standard and autonomous driving modes. An electric actuator mechanism 48 at least partially retracts the steering column assembly 20 into the instrument cluster of the vehicle during the transition mode. When the driver wants to transition back to the standard driving mode, the ADAS is deactivated and the electric actuator mechanism 48 extends the steering column assembly 20 to an extended position that allows the driver to easily handle the steering wheel. However, the embodiments described herein allow manual adjustment under certain circumstances, as described herein.

Extension and retraction of the steering column assembly 20 refers to translation of a retractable portion 28 of the steering column assembly 20. The retractable portion 28 includes one or more components that are translatable. For example, in addition to the aforementioned steering wheel and the steering shaft 26, a moveable portion, which may also be referred to as an upper jacket 28 in some embodiments, is translatable relative to a stationary portion 24, which may be referred to as a lower jacket in some embodiments. Also shown is a mounting bracket 25 that couples the steering column assembly 20 to the vehicle.

The electric actuator mechanism 48 is operatively coupled to the moveable portion 28 and the stationary portion 24 of the steering column assembly 20. A translating assembly facilitates automated telescoping (i.e., translating) and raking (i.e., tilting) of the steering column assembly. Several embodiments of translating assemblies are contemplated.

Figure 2:
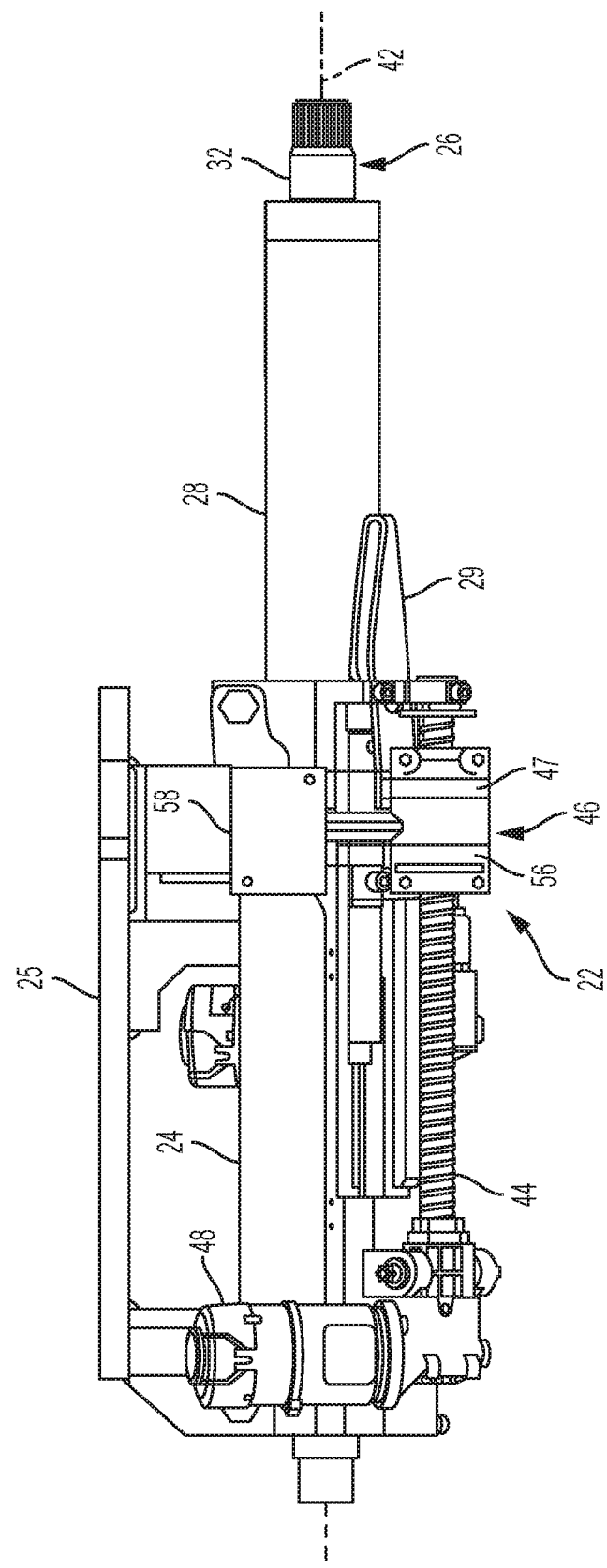
FIG. 2 is an elevational view of the steering column assembly.
Figure 3:
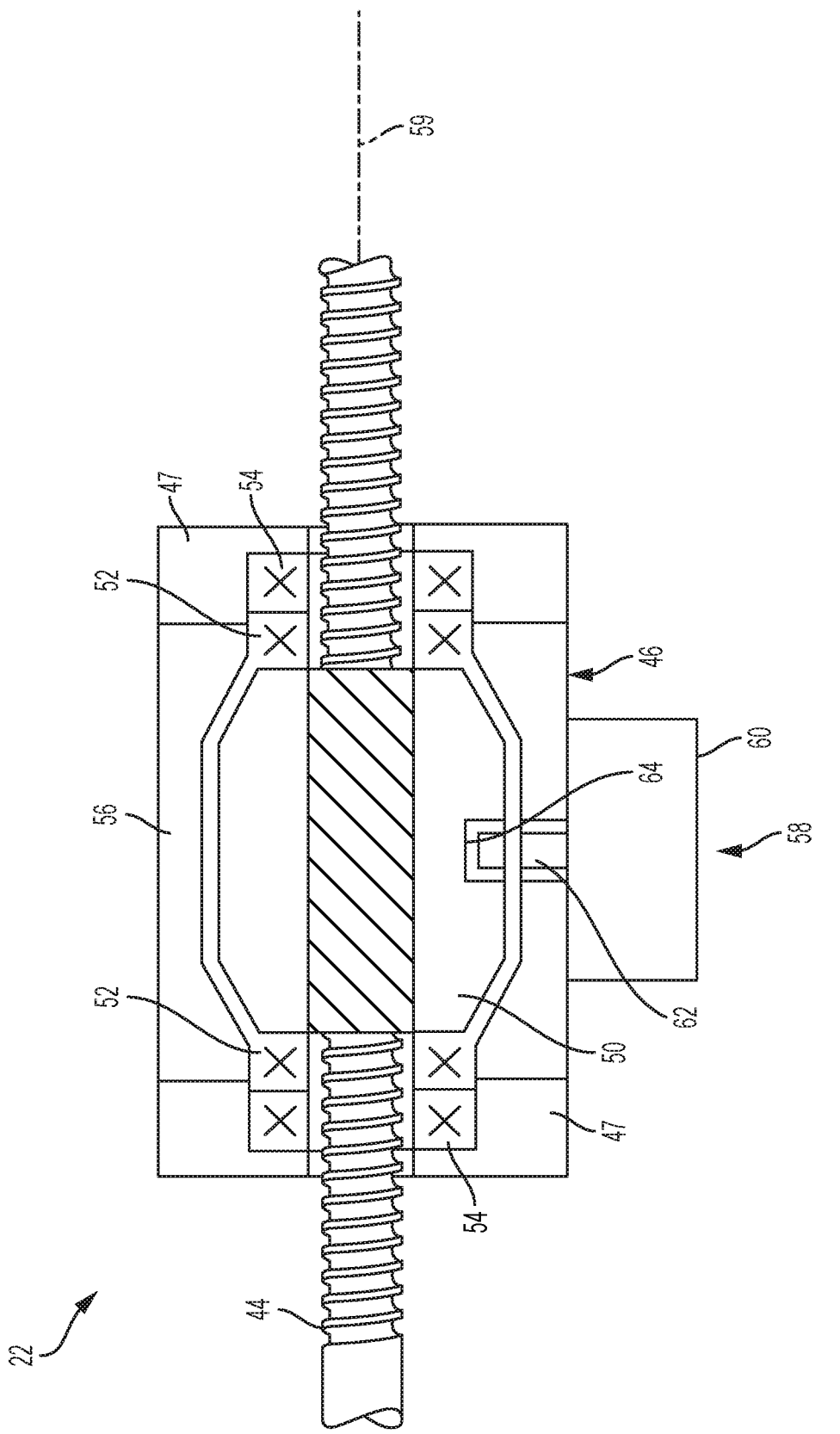
FIG. 3 is a sectional view of a portion of the steering column assembly.

FIGS. 2 and 3 illustrate an embodiment of features of a translating assembly that facilitate adjustment of the steering column assembly 20. Multiple embodiments of a clutch device and nut are described in detail in U.S. patent application Ser. No. 15/628,836, which is incorporated by reference herein its entirety. FIGS. 2 and 3 illustrate an example of such features, but it is to be appreciated that the embodiments described herein are applicable to any powered steering column that allows manual adjustment thereof in some conditions, with such conditions defined herein.

FIGS. 2 and 3 illustrate a screw or threaded rod 44, a shuttle assembly 46, and a drive means 48 (e.g., electric motor, see FIG. 1). The shuttle assembly 46 may include a shuttle 47 and a clutch device 58 that may be directly supported by and engaged to the shuttle 47, or a casing 56 of the shuttle 47.

The shuttle 47 of the shuttle assembly 46 may be mounted between the screw 44 and an E/A strap 29. More specifically, the shuttle assembly 46 is threadably mounted to the screw 44 for axial translation along the screw, and may be rigidly fixed to the E/A strap 29. In operation and when the electric motor 48 is rotating the screw 44, the shuttle assembly 46 axially translates along the rotating screw 44. During this axial translation, the rearward shaft portion 32 of the steering shaft 26 and the upper jacket 28 is carried by, and with, the shuttle assembly 46.

The shuttle assembly 46 may further include a nut or fixture 50, at least one bearing 52, at least one resilient member 54 (e.g., a coiled spring or a disc spring), and the casing 56. The screw 44 may be mounted for rotation to the lower jacket 24 and about a centerline 59, may not be mounted for axial translation along the lower jacket 24, and is rotatably driven by the electric motor 48 that may be rigidly mounted to the fixed lower jacket 24. The centerline 59 may be spaced from, and substantially parallel to, the axis 42.

The clutch device 58 may be mounted to the casing 56 and facilitates rotational decoupling of the nut 50 from the casing 56 (and/or shuttle 47). The clutch device 58 may include an electric servo 60 and a bolt 62. The servo 60 may be mounted to an exterior of the casing 56 and functions to move the bolt 62 into and out of at least one recess 64 defined by an external and circumferentially continuous surface of the nut 50. In one example, the recesses 64 may be axially extending grooves. The clutch device 58, including the electric servo 60 and the bolt 62 may be collectively referred to herein as a "latch" or "latch assembly."

In the present example, the casing 56 may be an integral part of the shuttle assembly 46 (i.e., one-piece), and thus axially translates with the shuttle assembly 46. The nut 50, the bearings 52, and the spring 54 may be mounted to the screw 44 inside the casing 56. The nut 50 is threaded to the screw 44 such that rotation of the screw 44 about centerline 59 causes the casing 56 and shuttle assembly 46 to axially translate along the screw 44. A first bearing 52 may be axially located between a first spring 54 and a forward end (i.e. annular face) of the nut 50. A second bearing 52 may be axially located between a second spring 54 and a rearward end of the nut 50.

In operation and when the steering column assembly 20 is in the powered state and the clutch device 58 is engaged, the forward and rearward bearings 52 minimize any friction produced between the springs 54 and the respective ends of the nut. The axial forces produced by the torque placed upon the screw 44 by the electric motor 48 when in the powered state are not sufficient to overcome the compressive force of the springs 54 (i.e., the springs do not compress axially).

When the steering column assembly 20 is in the decoupled state (i.e., not powered by the electric motor 48, the clutch device 58 is not engaged (i.e., the servo 60 is de-energized). A manual axial force produced by the driver to axially extend and or retract the steering column assembly 20 may cause the nut 50 to free-wheel (i.e., back spin) upon the, now stationary, screw 44 enabling the shuttle assembly 46 to axially translate.

Figure 4:
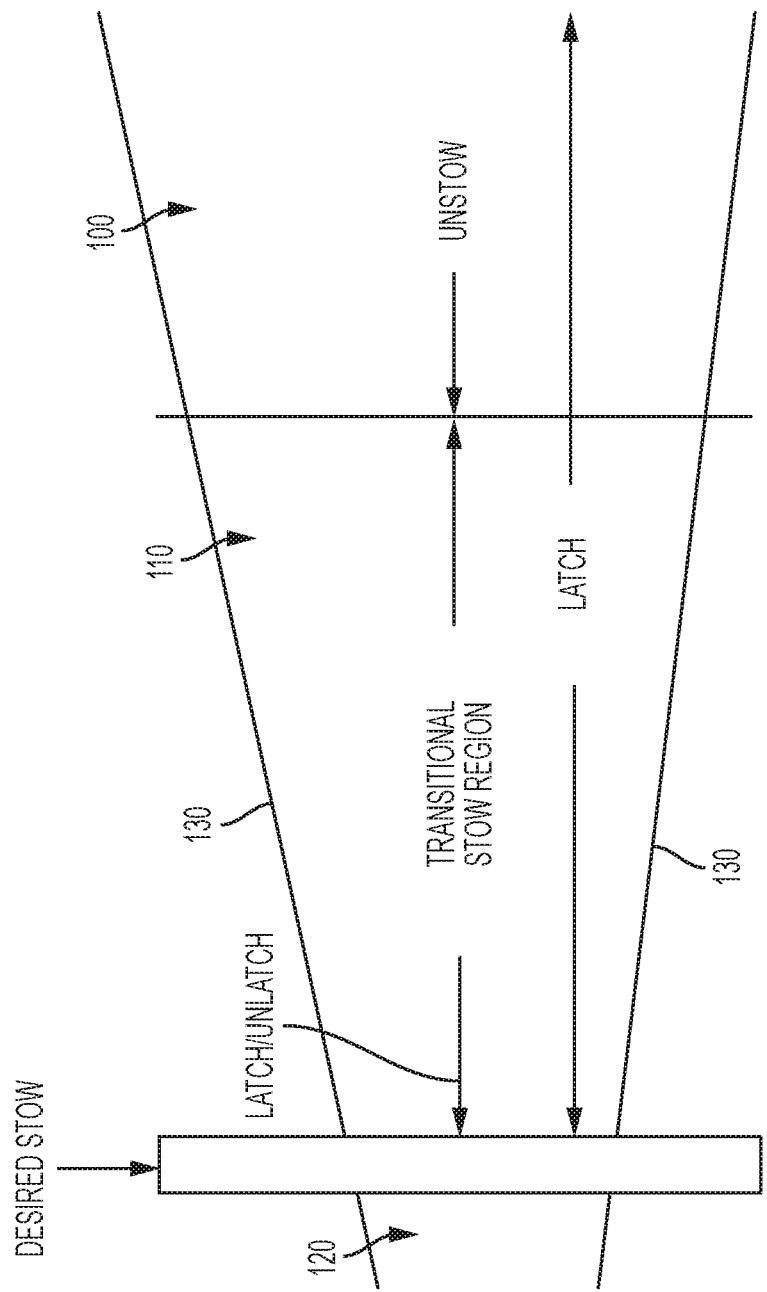
FIG. 4 is a diagram illustrating multiple regions associated with stowed and unstowed positions of the steering column assembly.

Referring now to FIG. 4, three discrete zones—or regions—associated with positioning of the steering column assembly 20 are illustrated. The embodiments described herein provide a system and method that automatically latches and unlatches the clutch device 58 in a power column during an ADAS event. As will be appreciated from the disclosure, this eliminates the need for the driver to wait until the column unstows from the stow position and it will provide the capability to restrict driver intervention during a stow operation.

A first region may be referred to as an unstowed region and is generally referenced with numeral 100. The first region 100 defines boundaries of the telescope and rake positions where the driver may have full control of adjustability of the steering column assembly 20. In other words, the driver has full control of telescope and/or rake adjustment when the steering column assembly 20 is in the first region 100. Reference to the steering column assembly 20 being within the first region 100 refers to a specified portion or location of the steering column assembly 20 being within the first region 100. For example, the most rearward portion of the overall assembly, such as the steering input device (e.g., steering wheel) may be the reference point of the overall assembly that defines when the steering column assembly 20 is considered to be in the first region 100. However, alternative reference points of the steering column assembly 20 may be employed in some embodiments.

A second region may be referred to as a transitional region and is generally referenced with numeral 110. The second region 110 defines boundaries of the telescope and rake positions where the driver cannot manually move the steering column assembly 20 towards the instrument cluster (i.e., forward in vehicle). In other words, the driver has partial control of telescope and/or rake adjustment when the steering column assembly 20 is in the second region 110, since s/he may only adjust the steering column assembly 20 rearwardly away from the instrument cluster. Reference to the steering column assembly 20 being within the second region 110 refers to a specified portion or location of the steering column assembly 20 being within the second region 110. For example, the most rearward portion of the overall assembly, such as the steering input device (e.g., steering wheel) may be the reference point of the overall assembly that defines when the steering column assembly 20 is considered to be in the second region 110. However, as with the first region description, alternative reference points of the steering column assembly 20 may be employed in some embodiments.

A third region may be referred to as a stowed region and is generally referenced with numeral 120. The third region 120 defines boundaries of the telescope and rake positions where the driver cannot manually move the steering column assembly 20 in any direction. In other words, the driver has no control of telescope and/or rake adjustment when the steering column assembly 20 is in the third region 120. Reference to the steering column assembly 20 being within the third region 120 refers to a specified portion or location of the steering column assembly 20 being within the third region 120. For example, the most rearward portion of the overall assembly, such as the steering input device (e.g., steering wheel) may be the reference point of the overall assembly that defines when the steering column assembly 20 is considered to be in the third region 120. However, as with the first and second region descriptions, alternative reference points of the steering column assembly 20 may be employed in some embodiments.

As shown in FIG. 4, each region 100, 110, 120 defines a tapering of the rake position boundary of the steering column assembly 20. The rake position boundary is referenced with numeral 130. Positioning and travel along the telescope path during stowing or unstowing of the steering column assembly 20, driver restriction can be applied for safe operation and transition. The above-described restrictions, system response and/or region boundaries are configurable based on the particular application of use, thereby providing design flexibility.

The latch (FIG. 3), i.e., clutch device 58, is provided to control when manual extension of the steering column assembly is permitted. In particular, the nut 50 is latched in the first and second regions 100, 110 (i.e., unstowed or transition region) so the steering column assembly can move automatically. However, if the steering column assembly is in the third region 120 (i.e., stowed), the nut 50 is unlatched to provide the driver with the option to manually pull the steering column assembly away from the stowed position for manual driving.

Figure 5:
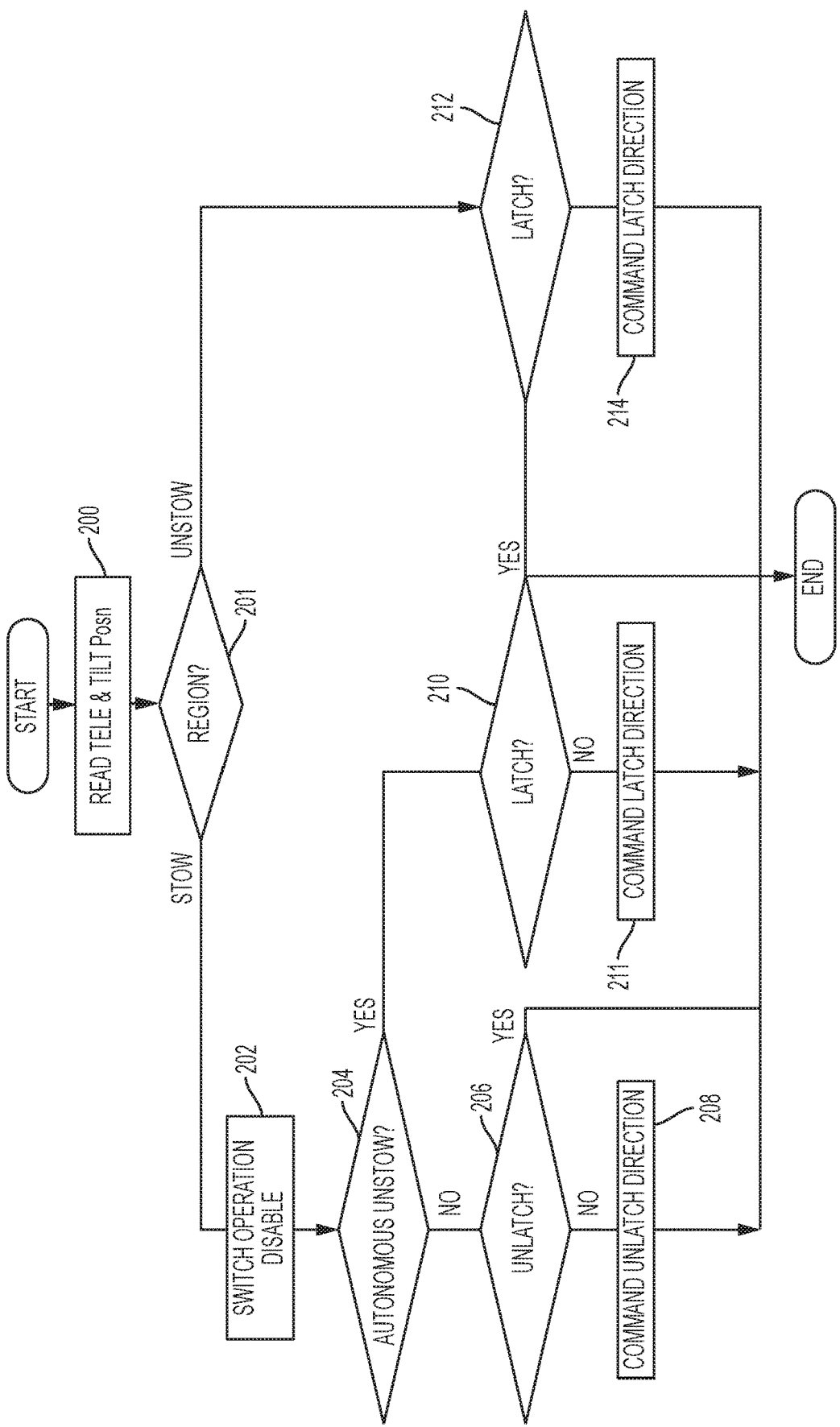
FIG. 5 is a flow diagram illustrating a method of controlling the steering column assembly.

Referring to FIG. 5, illustrated is a sequence of operating conditions of the steering column assembly 20, showing a method of automatically latching and unlatching the steering column assembly 20.

The telescope and tilt position of the steering column assembly 20 is detected at block 200. Such detection may be made at least in part with one or more sensors or a similar detection component. The detection determines which region 100, 110, 120 the portion of interest of the steering column assembly (e.g., retractable portion 28) is in at block 201. If within the third region 120 (i.e., stowed region), the capability to manually adjust the steering column assembly in any direction is not available. Disabling of a switch or the like is shown with block 202 to illustrate the adjustment restriction. The system determines if an automated unstowing (i.e., extending) event is occurring at block 204. If the steering column assembly 20 is not undergoing an unstowing event, the system determines if the clutch device 58 and nut 50 are unlatched at block 206. An unlatched condition allows the driver to quickly and easily manually extend the steering column assembly to an unstowed position. If an unlatched condition is not present, unlatching occurs at block 208.

Referring back to block 204, if it is determined that the steering column assembly 20 is undergoing an unstowing event, the system determines if the clutch device 58 and nut 50 are latched at block 210. If unlatched, the system commands latching to facilitate the automated unstowing action at block 211. If latched, the automated unstowing action is performed.

Referring back to block 202, if the steering column assembly is determined to be in the first or second region 100, 110 (i.e., unstowed), the system determines if the clutch device 58 and nut 50 are latched at block 212. If so, the latched state is maintained. If not, latching is commanded at block 214.

Although the system and method described above include three discrete regions that the steering column assembly 20 is moveable within, it is to be understood that more or fewer regions may be included in some embodiments. For example, only two regions may be provided, with one region allowing full or partial manual adjustment capability for a driver, while the other region may allow no or partial manual adjustment capability. Similarly, more zones may be provided, each with different manual adjustment capability restrictions.

The embodiments described herein monitor the position of at least a portion of the steering column assembly 20. The above-described latching and unlatching commands are performed by a latch motor and any suitable controllers and/or processing devices. To verify that the latch and unlatch commands occur, one or more of the following conditions may be utilized. For example, the system and method may determine if the current exceeds a current threshold, if a battery voltage based timer has expired, or if a Hall effect sensor indicates a latch or unlatch event.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A retractable steering column assembly comprising: a retractable portion;
    an electric actuator mechanism for translating and/or tilting the retractable portion; and
    a latch moveable between a latched condition and an unlatched condition, the unlatched condition allowing manual adjustment of the retractable portion, the latched condition preventing manual adjustment of the retractable portion, wherein the electric actuator mechanism translates and/or tilts the retractable portion throughout a plurality of regions, the latch in the latched condition in at least one of the plurality of regions and in the unlatched condition in at least one of the plurality of regions, wherein the plurality of regions comprises a first region and a second region, the first region located further from an instrument cluster than the distance between the second region and the instrument cluster, positioning of the retractable portion in the first region requiring the latch to be in the latched condition, positioning of the retractable portion in the second region requiring the latch to be in the unlatched condition.

2. The retractable steering column assembly of claim 1, wherein the retractable portion is an upper jacket of the steering column assembly.

3. A retractable steering column assembly comprising: a retractable portion;
    an electric actuator mechanism for translating and/or tilting the retractable portion; and
    a latch moveable between a latched condition and an unlatched condition, the unlatched condition allowing manual adjustment of the retractable portion, the latched condition preventing manual adjustment of the retractable portion, wherein the electric actuator mechanism translates and/or tilts the retractable portion throughout a plurality of regions, the latch in the latched condition in at least one of the plurality of regions and in the unlatched condition in at least one of the plurality of regions, wherein the plurality of regions comprises a first region, a second region and a third region, the first region located further from an instrument cluster than the distance between the second region and the instrument cluster, the second region located further from an instrument cluster than the distance between the third region and the instrument cluster, positioning of the retractable portion in the first region or the second region requiring the latch to be in the latched condition, positioning of the retractable portion in the third region requiring the latch to be in the unlatched condition.

4. The retractable steering column assembly of claim 3, wherein the steering column assembly is in an autonomous steering mode when the retractable portion is in the third region.

5. A method of controlling adjustment of a steering column assembly comprising:
 detecting a position of the steering column assembly;
 determining which one of a plurality of regions the position of the steering column assembly is within;
 unlatching a latch selectively engageable with the steering column assembly to allow manual adjustment of the steering column assembly if the steering column assembly is within at least one of the plurality of regions; and
 latching the latch to prevent manual adjustment of the steering column assembly if the retractable portion is within at least one of the plurality of regions, wherein detecting the position comprises detecting a position of a portion of a retractable portion of the steering column assembly, wherein the plurality of regions comprises a first region, a second region, and a third region, the first region located further from an instrument cluster than the distance between the second region and the instrument cluster, the second region located further from an instrument cluster than the distance between the third region and the instrument cluster, detecting whether the latch is in the latched condition while the retractable portion is in the first region and the second region.

6. The method of claim 5, further comprising moving the latch to the latched condition while the retractable portion is in the first region and the second region if the latched condition is not detected.

7. A method of controlling adjustment of a steering column assembly comprising:
 detecting a position of the steering column assembly;
 determining which one of a plurality of regions the telescope position of the steering column assembly is within;
 unlatching a latch selectively engageable with the steering column assembly to allow manual adjustment of the steering column assembly if the steering column assembly is within at least one of the plurality of regions; and
 latching the latch to prevent manual adjustment of the steering column assembly if the retractable portion is within at least one of the plurality of regions, wherein detecting the position comprises detecting a position of a portion of a retractable portion of the steering column assembly, wherein the plurality of regions comprises a first region, a second region, and a third region, the first region located further from an instrument cluster than the distance between the second region and the instrument cluster, the second region located further from an instrument cluster than the distance between the third region and the instrument cluster, wherein positioning of the retractable portion in the first region or the second region requires the latch to be in the latched condition, positioning of the retractable portion in the third region requires the latch to be in the unlatched condition.

8. A method of controlling adjustment of a steering column assembly comprising:
 detecting a position of the steering column assembly;
 determining which one of a plurality of regions the telescope position of the steering column assembly is within;
 unlatching a latch selectively engageable with the steering column assembly to allow manual adjustment of the steering column assembly if the steering column assembly is within at least one of the plurality of regions;
 latching the latch to prevent manual adjustment of the steering column assembly if the retractable portion is within at least one of the plurality of regions, wherein detecting the position comprises detecting a position of a portion of a retractable portion of the steering column assembly, wherein the plurality of regions comprises a first region, a second region, and a third region, the first region located further from an instrument cluster than the distance between the second region and the instrument cluster, the second region located further from an instrument cluster than the distance between the third region and the instrument cluster; and
 determining whether the retractable portion is being automatically extended while the retractable portion is in the third region.

9. The method of claim 8, further comprising detecting whether the latch is in the latched condition while the retractable portion is being automatically extended.

10. The method of claim 9, further comprising moving the latch to the latched condition if the latched condition is not detected.

11. The method of claim 8, further comprising detecting whether the latch is in the unlatched condition while the retractable portion is not being automatically extended.

12. The method of claim 11, further comprising moving the latch to the unlatched condition if the unlatched condition is not detected.

* * * * *